United States Patent
Hamilton

[11] 4,234,286
[45] Nov. 18, 1980

[54] VEHICLE BODY

[75] Inventor: Miles J. Hamilton, Laguna Beach, Calif.

[73] Assignee: DEC International, Inc., Madison, Wis.

[21] Appl. No.: 938,213

[22] Filed: Aug. 30, 1978

[51] Int. Cl.³ .............................................. B01F 7/08
[52] U.S. Cl. ............................................................ 414/512
[58] Field of Search .................. 296/39 R; 280/179 R; 414/501, 502, 504, 505, 512, 509, 521, 510

[56] References Cited
U.S. PATENT DOCUMENTS

| | | | |
|---|---|---|---|
| 2,808,158 | 10/1957 | Gilleo | 414/509 |
| 2,931,529 | 4/1960 | Osterhans | 414/502 |
| 4,060,960 | 12/1977 | Hengen | 414/505 |

Primary Examiner—John J. Love
Assistant Examiner—Norman L. Stack
Attorney, Agent, or Firm—Michael, Best & Friedrich

[57] ABSTRACT

A vehicle body including an outer shell including side walls, end walls and a floor. The floor has a discharge recess located at one end thereof inside the shell. A plurality of vertically positioned and spaced apart bulkhead members are mounted inside the shell to provide a plurality of separate, material containing, storage compartments therein. A bulkhead drive including a plurality of power screws is provided for successively driving the bulkhead members along the floor of the shell and over at least a portion of the discharge recess. The power screws each have an unthreaded portion and a threaded portion with the threaded portion normally in threaded engagement with the bulkhead members. The unthreaded portions of the power screws are located the discharge recess so that as each bulkhead member moves over the discharge recess it will become disengaged from the threaded portions of the power screws so that the lead bulkhead members can become nested over the discharge recess. The vehicle body is also provided with a discharge auger for discharging material from inside the discharge recess to the exterior of the vehicle body.

21 Claims, 10 Drawing Figures

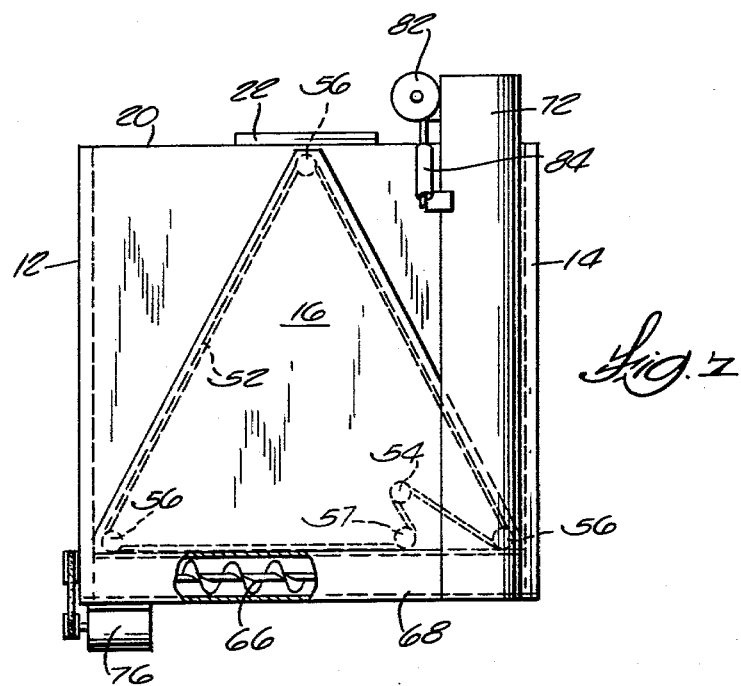
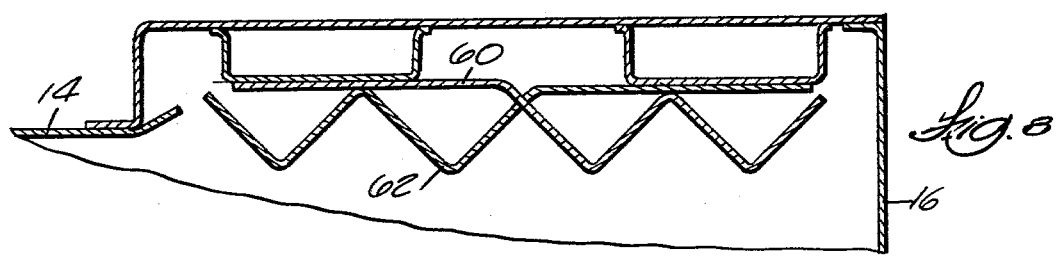
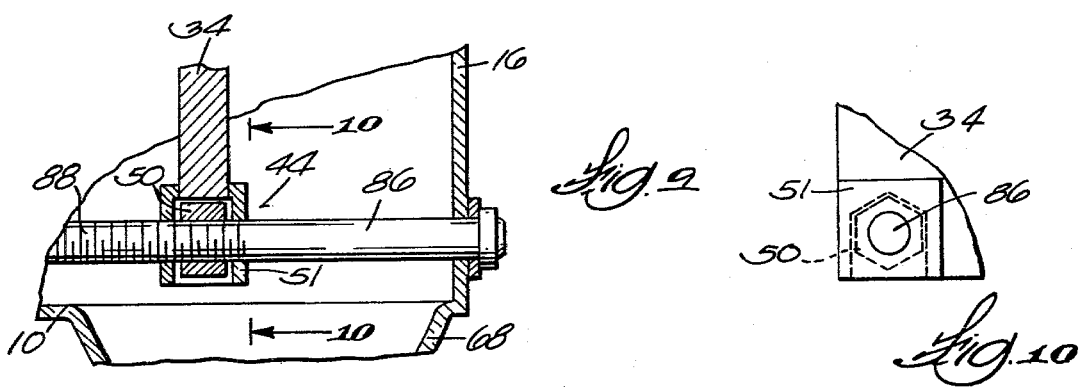

VEHICLE BODY

BACKGROUND OF THE INVENTION

The present invention relates to a vehicle body for transporting bulk material and more specifically to a body having a plurality of separate compartments therein which can be filled with materials of different type and amount and subsquentially selectively unloaded.

The most pertinent prior art items known to applicant are U.S. Pat. Nos. 3,211,308, 2,931,529, 2,454,101, 1,567,690 and 311,468.

SUMMARY OF THE INVENTION

A vehicle body including an outer shell comprised of a pair of side walls, a pair of end walls and a floor. A discharge auger means is provided for discharging material from inside a discharge recess located in the vehicle body. A moveable bulkhead means is mounted in the shell and includes a plurality of vertically positioned, spaced apart bulkhead members. A drive means is provided for the bulkhead members to drive such members toward and away from the discharge recess. The drive means includes a plurality of threaded power screws normally in threaded engagement with the bulkhead members. Each of said power screws has an unthreaded portion at one end thereof located above the discharge recess so that as each bulkhead member slides over the discharge recess it will become disengaged from the threaded portions of the power screws to thereby facilitate nesting of the lead bulkhead members over the discharge recess. A motor drive unit is provided for driving the power screws in synchronization.

DESCRIPTION OF THE DRAWINGS

FIG. 7 is an end elevation view of the truck body shown in FIG. 5;

FIG. 8 is an enlarged fragmentary sectional view taken along line 8—8 of FIG. 6;

FIG. 9 is an enlarged fragmentary view showing the threaded connection between one of the movable bulk heads and one of the power screws; and FIG. 10 is a sectional view taken along line 10—10 of FIG. 9.

DESCRIPTION OF THE PREFERRED EMBODIMENT

Figure 1:
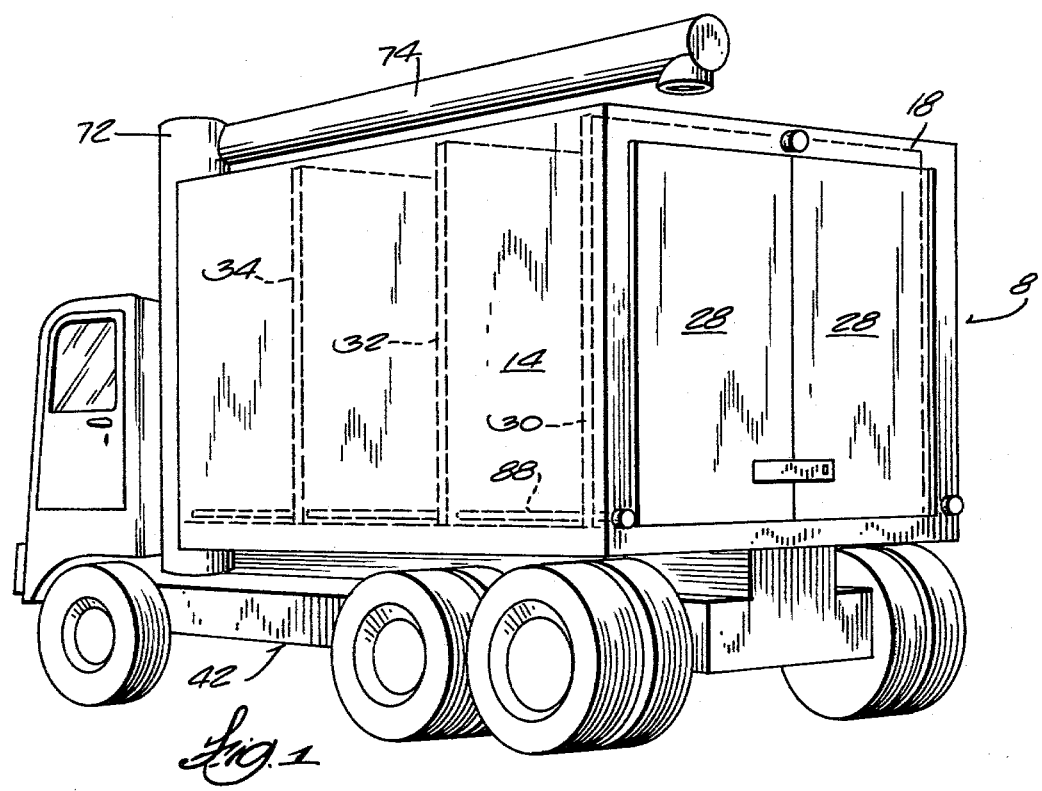
FIG. 1 is a perspective view of a truck on which is mounted a truck body made in accordance with the present invention.

Referring to the drawings in detail, the vehicle body 8 of the present invention is comprised of a floor 10, side walls 12, 14, end walls 16, 18, and a top wall 20. Top wall 20 is provided with hatch covers 22, 24, 26 and end wall 18 is provided with a pair of access doors 28, 28.

In the preferred embodiment the floor 10 is made of hardwood decking and the side walls 12, 14, end walls 16, 18 and top wall 20 are of aluminum reinforced with steel construction.

Mounted within the outer body structure described above is a movable bulkhead means comprised of a plurality of bulkhead or partition members 30, 32, 34 which are positioned in vertical planes and extended transversely of the longitudinal axis of the body. Members 30, 32 and 34 are dimensioned to fix snugly in sliding engagement with the floor and side walls of the body 8. Bulkhead members 30, 32 and 34 together with the outer body structure define a plurality of compartments 36, 38 and 40 within the truck body. In the preferred embodiment the sides and bottom edges of bulkheads 30, 32 and 34 are provided with nylon wipers (not shown in the drawings) to prevent leakage of material between adjacent compartments.

The entire truck body 8, described above, is mounted on a truck chassis 42 of any suitable design as best shown in FIG. 1.

The bulkhead members are slideably actuated inside the truck body by means of a bulkhead drive means comprised of a plurality of power screws 44, 46, 48 which are engaged with the bulkhead members by means of a plurality of power threaded nuts 50 as best shown in FIG. 9. Threaded power nuts 50 are mounted in housings 51 attached to bulkhead member 34. The sides of housings 51 fit snugly against the sides of the power nuts 50 to prevent rotation of the power nuts. The start of threads, both male and female on the power screws and nuts respectively, have the face cut off at 45° to the thread axis to facilitate engagement.

As best shown in FIG. 7 power screws 44, 46 and 48 are positioned with screws 44 and 46 adjacent the side walls and bottom of the truck body and with screw 48 adjacent the top wall centrally of the side walls.

Screws 44, 46 and 48 are mounted in radial-thrust bearings (not shown) at each end and are driven by a synchronized drive means comprised of an endless drive chain 52, a drive motor unit 54, a plurality of sprockets 56 mounted on the ends of the power screws (see FIG. 7) and a drive train tension adjuster 57. Pairs of oppositely facing spring detent members 58,58, 60,60 and 62,62 are mounted adjacent side walls 12 and 14 at the front or discharge end of the truck body. Spring members 58,58 60,60 and 62,62 are shaped in the form of a leaf-type spring having a flat base portion and a stepped or notched free-end portion. It should be noted that upper and lower pairs 58,58 and 62,62 are mounted with their free-ends extending rearwardly whereas the center pair 60,60 are mounted with their free-ends extending forwardly. The function of such spring detent members will be explained hereinafter.

A plurality of flexible connecting members 64 are connected between bulkhead members 30 and 32 and between bulkhead members 32 and 34. In the preferred embodiment connecting members 64 are in the form of steel cables. Also in the preferred embodiment there are three cables for each pair of bulkhead members, two positioned at a low position on each side of the body and one at a higher central position. The function of such flexible connecting members will be explained hereinafter.

A discharge means for mechanically discharging the contents of the truck body is comprised of a cross auger 66 mounted cross-ways of the truck body in a downwardly extending recess or trough 68 at the front (discharge end) of the body. The discharge means further includes a short, horizontally extending auger 70, a vertical auger unit 72 and a boom auger unit 74.

Augers 66, 70, 72 and 74 are driven by motor drive units 76, 78, 80 and 82 respectively. Boom auger unit 74 can be rotated in a horizontal plane above the top of the truck body and can be pivoted upwardly in a vertical plane by means of a power cylinder 84.

In the preferred embodiment motor drive units 54, 76, 78, 80 and 82 are of the hydraulic type with power generated, for example, by a pump (not shown) connected to a power take-off unit on the drive train of the truck.

OPERATION

Figure 2:
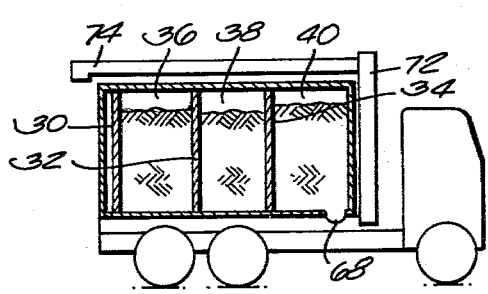
FIGS. 2, 3 and 4 are partially schematic views illustrating the operation of the present invention.

Assuming the truck has been loaded with material in each of compartments 36, 38 and 40 as shown in FIG. 2. It will be appreciated that the type and amount of material in each compartment can be different.

Assume now that it is desired to unload the material in compartment 40. This is accomplished by energizing drive motor 54 in the discharge direction. At the same time all the auger drive motors 76, 78, 80 and 82 are also energized.

Figure 3:
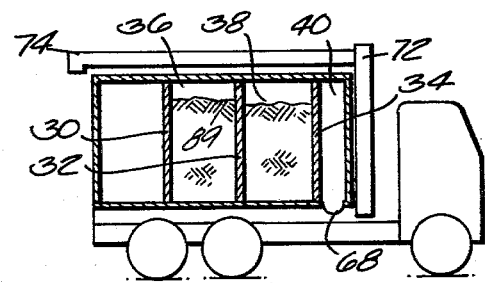

Energization of motor 54 will cause power screws 44, 46, and 48 to be rotated in synchronization which in turn will cause bulkhead members 30, 32 and 34 to move to the right as viewed in FIGS. 2 and 3. As this occurs, material in commpartment 40 will be discharged to the exterior of the truck body by the discharge auger means. More specifically, as bulkhead member 34 moves to the right the material in compartment 40 will be continuously pushed into trough 68. The material in trough 68 is carried by cross auger 66 to short, horizontal auger 70, then to vertical auger 72 and then out to the desired location through boom auger unit 74.

When the bulkhead members reach the position shown in FIG. 3 the power screw drive motor 54 is stopped. The auger drive motors continue to run until all material in compartment 40 is discharged. The operation of the drive motors is controlled by an operator from a suitable control station, preferably located adjacent the discharge end of the truck body. A viewing window (not shown) in the side wall of the truck body at the discharge end thereof is provided so that the operator can observe the position of the bulkhead members as they move toward the discharge end of the truck body.

When the material in compartment 40 is completely discharged the material in compartments 38 and 36 can then be selectively discharged at the same or different locations as desired.

This is accomplished by again energizing power screw drive motor 54 in the discharge direction while at the same time energizing the auger drive motors as required.

It should be noted at this point that a relatively short portion 86 (approximately 16") of each power screw at be discharged ends thereof is unthreaded (see FIG. 9). Also, as shown in FIG. 9, the threaded portions of the power screws are identified by the reference material 88.

Thus, upon energization of the power screws when the bulkhead members are in the FIG. 3 position, the bulkhead member 34 will move off threaded portions 88 of the power screws and onto the unthreaded portions 86. The mass of the material in compartment 38 being pushed by moving bulkhead member 32 will cause bulkhead member 34 to be pushed all the way to the discharge end of the truck body until it makes contact with end wall 16. The material in compartment 38 and then the material in compartment in 36 can be sequentially discharged as desired. After all three compartments 40, 38 and 36 have been emptied, bulkhead members 34 and 32 will nested up against end wall 16. As explained above, such nesting of the bulkhead members opposite the discharge recess provided by trough 68, is facilitated by the unthreaded portions 86 of the power screws.

It should be noted at this point that as the bulkhead members are moved to the discharge end of the truck body over the discharge recess fanned by trough 68 they will move into engagement with the detent springs 58,58, 60,60 and 62,62, which springs, as will be explained in detail hereinafter, serve to maintain the bulkhead members in proper operating position.

The movement of the last or rear bulkhead member 30 is controlled by any suitable means so that it will never be disengaged from the threaded portions 88 of the power screws. In the preferred embodiment the travel movement limit means for bulkhead member 30 is in the form of a plurality of rod members 89 (FIG. 4) fastened to bulkhead member 30 adjacent each of the power nuts 50 mounted therein. Such rod members 89 are dimensioned so as to engage bulkhead member 32 before bulkhead member 30 moves out of engagement with the threaded portions 88 of the power screws. The hydraulic drive motor unit 54 is provided with a suitable pressure sensitive by-pass means so that it will stop automatically when the movement of bulkhead member is stopped by rod members 89. This travel movement limit feature is important to facilitate proper reverse movement of the bulkhead members back to their truck loading position as shown in FIG. 2 and as will now be described.

Figure 4:
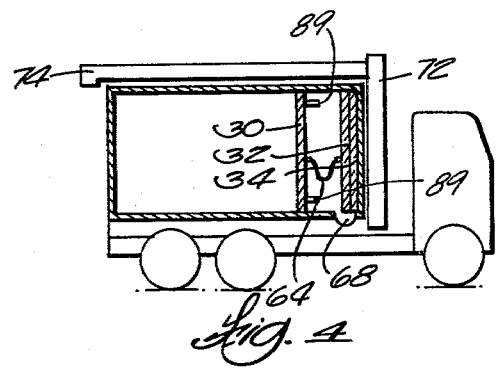
Figure 6:
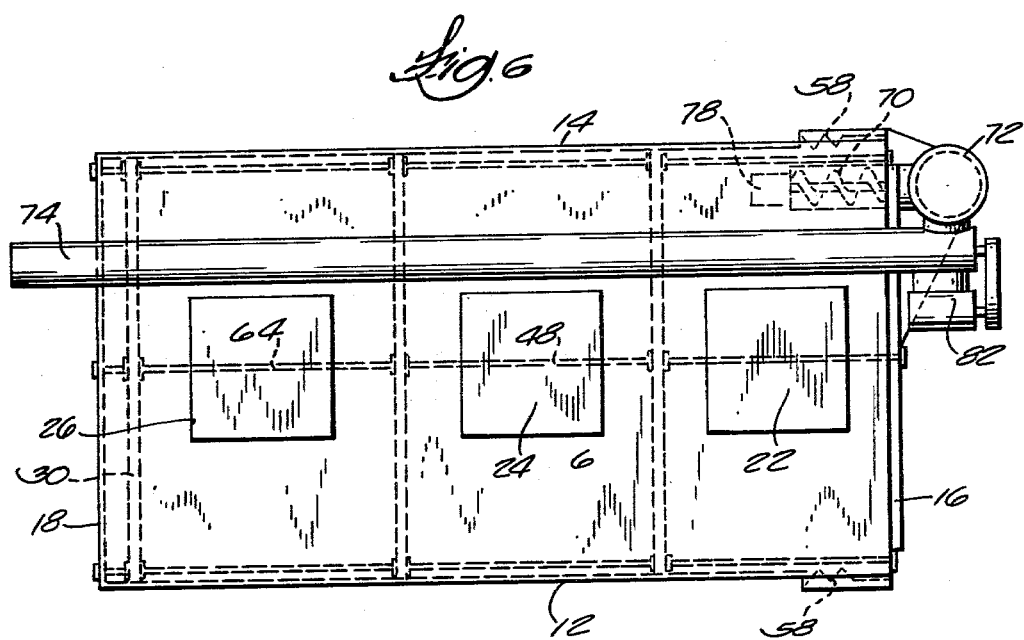
FIG. 6 is a top plan view of the truck body shown in FIG. 5.
Figure 5:
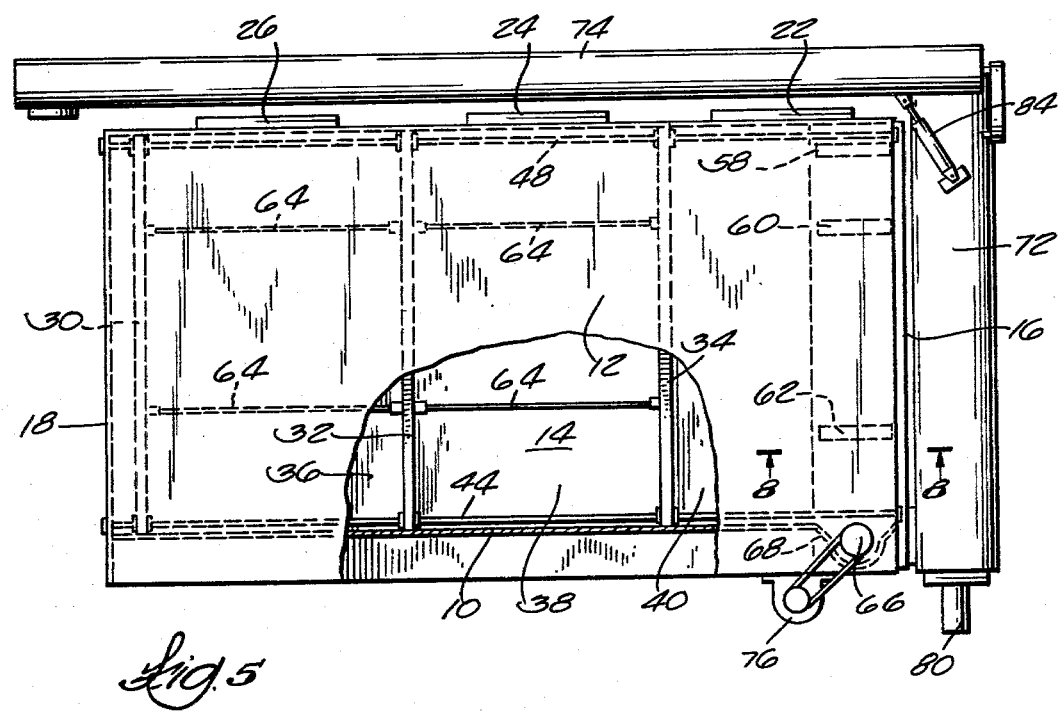
FIG. 5 is a side elevation view (with parts broken away) of a truck body made in accordance with the present invention.

The reverse operation of the bulkhead members can best be explained by reference to FIG. 4. When it is desired to return the bulkhead members to the FIG. 2 position, the power screw motor 54 is energized in the return direction. Since bulkhead member 30 is still in threaded engagement with the threaded portions 88 of the power screws, it will be moved rearwardly to the left the slack in cables 64 will be taken up until bulkhead member 30 begins "pulling" on bulkhead member 32. Bulkhead member 32 will then be pulled along the unthreaded portions 86 of the power screws until the power nuts 50 mounted therein become engaged with the threaded portions 88 of the power screws. Bulkhead member 32 will then "pull" bulkhead member 34 to the left in the same manner until it moves into engagement with the threaded portions 88 of the power screws. The power screws will then continue to drive all three bulkhead members to the left until they reach the FIG. 2 position.

It will be appreciated that as bulkhead members 32 and 34 are pulled from the full discharge position into threaded engagement with the power screws, it is important that they maintain a "square" relationship with respect to the floor and side walls of the truck body. Such a "square" relationship is maintained by the action of detent spring members 58,58 60,60 and 62,62. This is because the edges of the bulkhead members will sequentially engage the adjacent steps or notches in the detent members to thereby maintain each bulkhead member in a "square" relationship as they are moved along the unthreaded portions 86 of the power screws.

I claim:

1. A vehicle body comprising:

an outer shell including side walls, end walls and a floor;

a discharge means for discharging material from inside said outer shell to the exterior thereof, said discharge means including a discharge recess located inside said outer shell;

a movable bulkhead means mounted in said shell, said movable bulkhead means including a plurality of vertically positioned, spaced apart bulkhead members, each of said bulkhead members having a bulkhead drive engagement means thereon;

a bulkhead drive means for driving said bulkhead members toward and away from said discharge recess, said drive means including a plurality of threaded power screws having a threaded portion in threaded engagement with said bulkhead drive engagement means on said bulkhead members, said power screws each having an unthreaded portion at one end thereof adjacent said discharge recess so that as each bulkhead member slides over said discharge recess it will become disengaged from the threaded portions of said power screws, said drive means further including a motor drive unit for driving said power screws in synchronization.

2. A vehicle body according to claim 1, in which said bulkhead drive means further includes a plurality of cable members connected between adjacent bulkhead members to provide a means for one bulkhead member to pull on the next adjacent bulkhead member for purposes of pulling said bulkhead members along the unthreaded portions of said power screws to thereby reestablish threaded engagement between said bulkhead members and the threaded portions of said power screws.

3. A vehicle body according to claim 2, in which there are a plurality of detent spring members mounted on the side walls of said outer shell, said detent spring members adapted to engage the edges of said bulkhead members as they slide along the unthreaded portions of said power screws to thereby maintain said bulkhead members in a substantially "square" relationship with respect to the side walls of said outer shell.

4. A vehicle body according to claim 1, in which there are a plurality of detent spring members mounted on the side walls of said outer shell, said detent spring members adapted to engage the edges of said bulkhead members as they slide along the unthreaded portions of said power screws to thereby maintain said bulkhead members in a substantially "square" relationship with respect to the side walls of said outer shell.

5. A vehicle body according to claim 1, in which said discharge means includes a plurality of auger drive members.

6. A vehicle body according to claim 5, in which said plurality of auger drive members are comprised of a cross auger mounted in said discharge recess, a short horizontal auger operatively associated with said cross auger, a vertical auger operatively associated with said short, horizontal auger and a boom auger operatively associated with said vertical auger.

7. A vehicle body according to claim 6, in which said boom auger can be rotated in a horizontal plane above the vehicle body.

8. A vehicle body according to claim 7, in which said boom auger can also be pivoted upwardly in a vertical plane.

9. A vehicle body according to claim 1, in which said bulkhead drive means further includes a stop means to stop the movement of the last bulkhead member before it becomes disengaged from the threaded portions of said power screws.

10. A vehicle body according to claim 9, in which said bulkhead drive means further includes a plurality of cable members connected between adjacent bulkhead members to provide a means for one bulkhead member to pull on the next adjacent bulkhead member for purposes of pulling said bulkhead members along the unthreaded portions of said power screws to thereby reestablish threaded engagement between said bulkhead members and the threaded portions of said power screws.

11. A vehicle body according to claim 1, in which said bulkhead drive means further includes an endless chain drive member in driven engagement with said motor drive unit, said power screws extending through one end wall of said outer shell for engagement with said endless chain drive member.

12. A vehicle body comprising:

an outer shell including side walls, end walls and a floor;

a discharge means for discharging material from inside said outer shell to the exterior thereof, said discharge means including a discharge recess located inside said outer shell;

a movable bulkhead means mounted in said shell, said movable bulkhead means including a plurality of vertically positioned, spaced apart bulkhead members, said bulkhead members together with said outer shell providing a plurality of separate material containing storage compartments, each of said bulkhead members having a bulkhead drive engagement means thereon; and a bulkhead drive means for successively driving each of said bulkhead members along the floor of the shell over at least a portion of said discharge recess so that material in said storage compartments will be successively deposited in said discharge recess, said drive means including a plurality of threaded power screws, said power screws each having an unthreaded portion and a threaded portion with said threaded portion normally in threaded engagement with said bulkhead drive engagement means on said bulkhead members, said unthreaded portions of said power screws located above said discharge recess so that as successive bulkhead members move over said discharge recess they will become disengaged from the threaded portions of said power screws, said drive means further including a motor drive unit for driving said power screws in synchronization.

13. A vehicle body according to claim 12, in which said bulkhead drive means further includes an endless chain drive member in driven engagement with said motor drive unit, said power screws extending through one end wall of said outer shell for engagement with said endless chain drive member.

14. A vehicle body according to claim 12, in which said bulkhead drive means further includes a stop means to stop the movement of the last bulkhead member before it becomes disengaged from the threaded portions of said power screws.

15. A vehicle body according to claim 14, in which said bulkhead drive means further includes a plurality of cable members connected between adjacent bulkhead members to provide a means for one bulkhead member to pull on the next adjacent bulkhead member for purposes of pulling said bulkhead members along the unthreaded portions of said power screws to thereby reestablish threaded engagement between said bulkhead members and the threaded portions of said power screws.

16. A vehicle body according to claim 12, in which said bulkhead drive means further includes a plurality of cable members connected between adjacent bulkhead members to provide a means for one bulkhead member to pull on the next adjacent bulkhead member for purposes of pulling said bulkhead members along the unthreaded portions of said power screws to thereby reestablish threaded engagement between said bulkhead members and the threaded portions of said power screws.

17. A vehicle body according to claim 12, in which there are a plurality of detent spring members mounted on the side walls of said outer shell, said detent spring members adapted to engage the edges of said bulkhead members as they slide along the unthreaded portions of said power screws to thereby maintain said bulkhead members in a substantially "square" relationship with respect to the side walls of said outer shell.

18. A vehicle body according to claim 12, in which said discharge means includes a plurality of auger drive members.

19. A vehicle body according to claim 18, in which said plurality of auger drive members are comprised of a cross auger mounted in said discharge recess, a short horizontal auger operatively associated with said cross auger, a vertical auger operatively associated with said short, horizontal auger and a boom auger operatively associated with said vertical auger.

20. A vehicle body according to claim 19, in which said boom auger can be rotated in a horizontal plane above the vehicle body.

21. A vehicle body according to claim 20, in which said boom auger can also be pivoted upwardly in a vertical plane.

* * * * *